United States Patent
Driemeyer Franco et al.

(10) Patent No.: US 12,187,160 B2
(45) Date of Patent: Jan. 7, 2025

(54) BALANCING METHOD

(71) Applicant: RENAULT S.A.S, Boulogne Billancourt (FR)

(72) Inventors: Ana-Lucia Driemeyer Franco, Guyancourt (FR); Pierre-Mikael Viollin, Guyancourt (FR)

(73) Assignee: AMPERE S.A.S, Boulogne Billancourt (FR)

( * ) Notice: Subject to any disclaimer, the term of this patent is extended or adjusted under 35 U.S.C. 154(b) by 32 days.

(21) Appl. No.: 18/256,322

(22) PCT Filed: Dec. 6, 2021

(86) PCT No.: PCT/EP2021/084327
§ 371 (c)(1),
(2) Date: Jun. 7, 2023

(87) PCT Pub. No.: WO2022/122621
PCT Pub. Date: Jun. 16, 2022

(65) Prior Publication Data
US 2024/0034192 A1  Feb. 1, 2024

(30) Foreign Application Priority Data

Dec. 8, 2020  (FR) .................................... 20 12815

(51) Int. Cl.
*B60L 58/22*  (2019.01)
*H02J 7/00*  (2006.01)

(52) U.S. Cl.
CPC ............ *B60L 58/22* (2019.02); *H02J 7/0016* (2013.01)

(58) Field of Classification Search
CPC ............ B60L 58/22; H02J 7/00; H02J 7/0016
See application file for complete search history.

(56) References Cited

U.S. PATENT DOCUMENTS

| | | |
|---|---|---|
| 2018/0354387 A1 | 12/2018 | Wand |
| 2019/0361075 A1 | 11/2019 | Lee et al. |
| 2020/0011934 A1 | 1/2020 | Tabatowski-Bush et al. |
| 2020/0153255 A1 | 5/2020 | Inoue et al. |
| 2021/0167610 A1 | 6/2021 | Yoon |

FOREIGN PATENT DOCUMENTS

WO   WO 2020/085819 A1   4/2020

OTHER PUBLICATIONS

International Search Report issued Mar. 9, 2022 in PCT/EP2021/084327 filed on Dec. 6, 2021, 3 pages.
Preliminary French Search Report issued Oct. 13, 2021 in 20 12815 filed on Dec. 8, 2020, 3 pages (with English Translation of Categories of Cited Documents).

*Primary Examiner* — Robert L Deberadinis
(74) *Attorney, Agent, or Firm* — Oblon, McClelland, Maier & Neustadt, L.L.P.

(57) ABSTRACT

A method for controlling the cell balancing of a battery of electrical accumulators of an electrical system includes balancing, for each subgroup, the cell having the largest amount of electrical charge to be balanced with selected cells.

7 Claims, 2 Drawing Sheets

BALANCING METHOD

Figure 1:
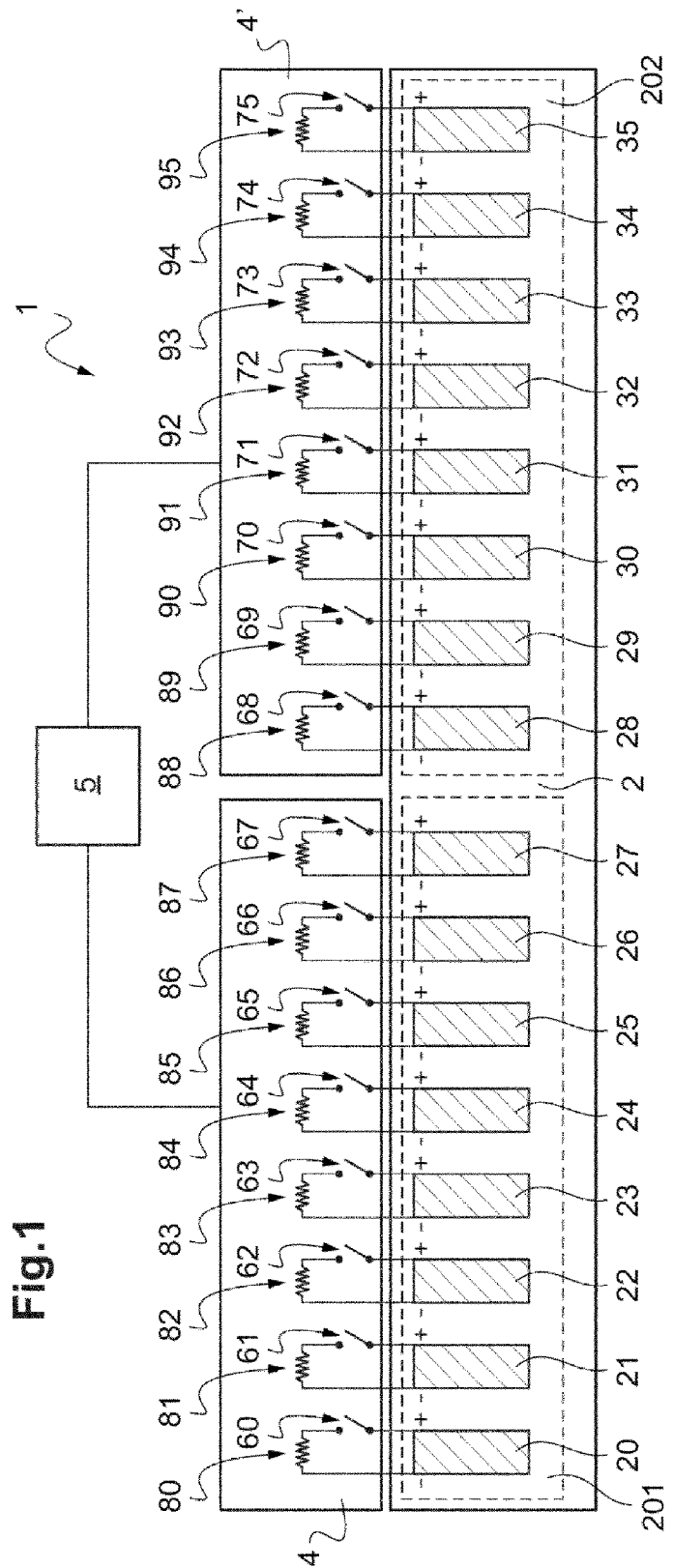

The invention relates to a method for balancing the cells of a battery of electric accumulators.

In particular, the invention relates to management of the batteries of electric or hybrid vehicles.

An electric, hybrid or even rechargeable hybrid vehicle comprises a battery of electric accumulators that is formed of a high number of cells in series and/or in parallel.

Although, in a battery of accumulators, all the cells have characteristics similar to the other cells, dispersions or differences, which are especially physical, however remain, such as dispersions in capacity in ampere-hours (Ah) and in resistance in ohms ($\Omega$). Generally temporary dispersions in the states of these cells, such as differences in state of charge (SOC) and/or temperature, also occur.

Over the course of time and of use of the battery, all of these physical dispersions and differences in state cause the cells to age differently. This difference in the rate of aging of the cells causes state of health (SOH) to differ from one cell to another.

However, any difference in state of charge between cells mounted in series is a limiting parameter since the total usable capacity of the battery is directly impacted. Specifically, the greater the difference in charge between the cells, the more the total usable capacity of the battery decreases. This therefore has a negative impact on the range of the electric vehicle.

This is why it is necessary to balance the cells on a regular basis. Balancing is carried out by a battery management system (BMS), directly and independently.

In the majority of cases, it is a question of so-called "dissipative" balancing (also called "passive" balancing), which consists in balancing the states of charge of the cells by discharging the cells into a resistor to a target state of charge, in general the state of charge of the cell having the lowest SOC.

When the balancing circuit is well dimensioned, i.e. when the balancing current is sufficient, and when the balancing strategy is used regularly, the dispersion in state of charge between cells is kept lower than a given threshold.

This threshold depends inter alia on the precision of measurement of the cell voltages.

However, this balancing strategy can be activated only during operation of the vehicle.

These strategies therefore do not make it possible to avoid cell imbalance during long parking phases.

It is in addition known that conventional cell balancing is not dimensioned to balance, during driving phases, a sufficient number of ampere-hours for electric vehicles.

Thus, by way of example, in the context of conventional balancing, and for a nominal cell voltage of 2.5V, with a balancing resistor of 130 ohms, if a motor-vehicle user profile with 25 days of use per month, 20 minutes of daily commuting in the worst case, and 1 h20 of charging per month is considered, then in this precise case active balancing will only be able to rebalance 0.064423077 Ah versus a need of 0.7 Ah, considering a cell of 140 Ah.

Therefore, in order to be able to ensure the cells are balanced whatever the profile of use of the motor vehicle, it is necessary to deploy a stand-alone balancing strategy, implemented when the motor vehicle is asleep. By asleep what is meant is a state in which the motor vehicle is shut down and in which its computers are shut down.

The objective is further not to draw power from the on-board supply grid of the vehicle, since it is necessary to carry out this operation with all the computers, including the BMS, asleep.

Thus, there is a need for a method for balancing cells that is stand-alone, that works when the motor vehicle is asleep and that does not cause the cells either to overheat or over-discharge.

Document US 2018/0354387 A1, which describes a method for balancing battery cells when the motor vehicle is asleep, is especially known in the prior art, this method implementing stand-alone integrated circuits, such as application-specific integrated circuits (ASICs). However, the described method is relatively inefficient and does not allow the range of the motor vehicle to be optimized.

Thus, the invention aims to provide a stand-alone and optimized cell-balancing solution that works when the motor vehicle is asleep and that does not cause overheating of the battery, or of its management units, nor over-discharging of the cells.

To this end a method is provided for controlling balancing of the cells of a battery of electrical accumulators of an electrical system comprising a main management unit and a plurality of stand-alone slave devices, said cells of said battery being separated into a plurality of sub-groups, each associated with one stand-alone slave device, and said cells of each sub-group being arranged beside one another, each cell of each sub-group being each connected to a circuit in the stand-alone slave device comprising an associated controlled switch and an associated resistor, said resistors of each stand-alone slave device being connected in a row;

for each sub-group, each stand-alone slave device is configured to receive control commands from said main management unit and to control said controlled switches depending on the received control commands so as to balance the charges of said cells of said sub-group.

Said method comprises, for each stand-alone slave device of each sub-group of cells, steps consisting in:

receiving, for each cell associated with said stand-alone slave device, the amount of electric charge to be balanced;

determining, among the set of cells associated with said stand-alone slave device, the cell having the greatest amount of electric charge to be balanced;

selecting as candidate cells for balancing the other cells of said sub-group that are associated with a resistor not adjacent to the resistor associated with said cell having the greatest amount of electric charge to be balanced;

excluding, from said selection of candidate cells, cells for which the charge to be balanced is less than a predetermined threshold value;

commanding said stand-alone slave device to control the connected switches so as to balance the cell having the greatest amount of electric charge to be balanced with the cells of said selection of candidate cells; and shutting down the main management unit during balancing.

The method thus makes it possible to balance the battery cells when the main management unit is off, by discharging the cells to be balanced into their associated resistor, this allowing optimal balancing to be obtained while ensuring that the balancing does not cause overheating of the slave devices, and especially of the balancing resistors, through selection of non-adjacent resistors, and while avoiding any over-discharging, especially through definition of a predetermined threshold value defining whether a cell is eligible for balancing.

Advantageously and non-limitingly, for each sub-group, the resistors associated with said cells are identified by the stand-alone slave device by a numerical identifier, the resistors being arranged in each sub-group so that two adjacent resistors have a numerical identifier of different parity, characterized in that that the selecting step is preceded by an identifying step in which the parity value of the resistor associated with said cell having the greatest amount of electric charge to be balanced is identified, the selecting step comprising selecting, as candidate cells for balancing, cells associated with resistors having a parity identical to the parity determined for the resistor of the cell having the greatest amount of electric charge to be balanced.

Thus, candidate cells are selected for balancing by selecting the cells associated with a resistor of the same parity as the resistor of the cell to be balanced, and hence resistors not adjacent to the resistor of the cell to be balanced are detected in a relatively simple manner. This allows a selecting method that is fast and relatively simple from an algorithmic point of view to be obtained.

Advantageously and non-limitingly, said predetermined threshold value is determined depending on a maximum duration of stand-alone operation of the stand-alone slave devices multiplied by a maximum balancing current between two cells. This allows a relevant and relatively optimal threshold value to be obtained.

However, the invention is not limited to such a calculation and according to one alternative the predetermined threshold value may be set in a step prior to the implementation of the method.

The Invention Also Relates to a Main Management Unit of an Electrical System Comprising a Battery of Electric Accumulators and a Plurality of Stand-Alone Slave Devices, said cells of said battery being separated into a plurality of sub-groups, each associated with one stand-alone slave device, and said cells of each sub-group being arranged beside one another, each cell of each sub-group being each connected to a circuit in the stand-alone slave device comprising an associated controlled switch and an associated resistor, said resistors of each stand-alone slave device being connected in a row;

for each sub-group, each stand-alone slave device is configured to receive control commands from said main management unit and to control said controlled switches depending on the received control commands so as to balance the charges of said cells of said sub-group;

characterized in that said main management unit comprises:

means for receiving, for each cell associated with said stand-alone slave device, the amount of electric charge to be balanced;

means for determining, among the set of cells associated with each stand-alone slave device, the cell having the greatest amount of electric charge to be balanced, for each stand-alone slave device;

means for selecting, as candidate cells for balancing, the other cells of said sub-group that are associated with a resistor not adjacent to the resistor associated with said cell having the greatest amount of electric charge to be balanced;

means for excluding, from said selection of candidate cells, cells for which the charge to be balanced is less than a predetermined threshold value, for each stand-alone slave device;

means for commanding each stand-alone slave device to control the connected switches so as to balance the cell having the greatest amount of electric charge to be balanced with the cells of said selection of candidate cells; and means for achieving auto-shutdown during balancing.

The invention also relates to an electrical system comprising a battery of electrical accumulators, a plurality of stand-alone slave devices, and a main management unit such as described above, said unit being configured to implement the method such as described above.

The invention also relates to a motor vehicle comprising an electrical system such as described above.

Figure 2:
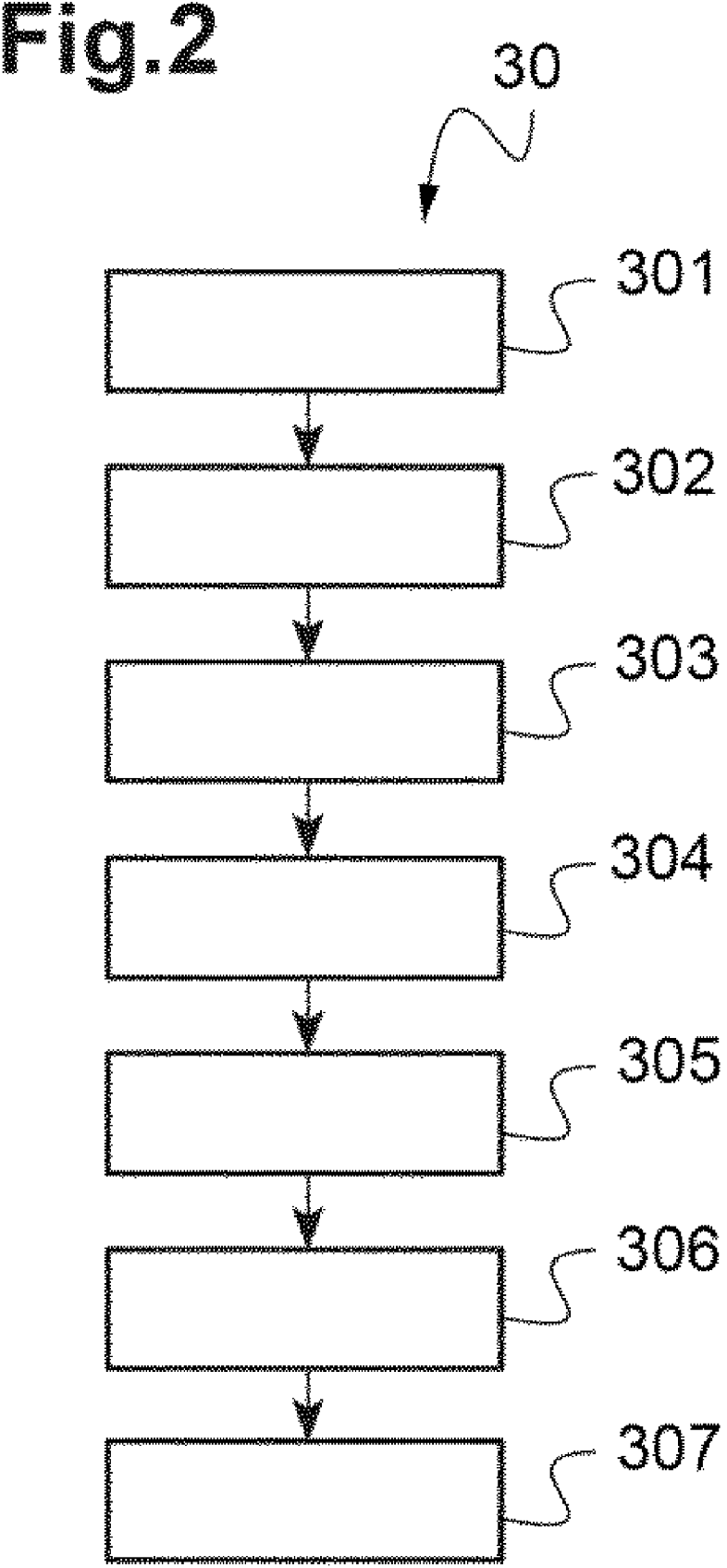

Other particularities and advantages of the invention will become apparent on reading the description given below of one particular embodiment of the invention, which embodiment is given by way of non-limiting indication, with reference to the appended drawings, in which:

FIG. 1 is a schematic view of an electrical system according to the invention; and FIG. 2 is a flowchart of one implementation of the method according to the invention.

As FIGS. 1 and 2 relate to the same first embodiment of the invention, they will be discussed simultaneously.

An electrical system 1 of an electric, hybrid or rechargeable hybrid vehicle comprises a battery 2 of electrical accumulators.

This battery 2 of electric accumulators is made up of a plurality of distinct cells 20-35, which are arranged in the vicinity of one another.

The cells are in this example numbered so that they may also be identified by a parity value, even cells being associated with an even number, and odd cells being associated with an odd number, the cells thus being aligned so that an even cell alternates with an odd cell.

The cells are divided into two sub-groups 201 and 202, the first sub-group 201 comprising cells 20 to 27, and the second sub-group comprising cells 28 to 35.

Although in the present example each sub-group 201, 202 comprises 8 cells, the invention is not limited to this single example. In particular, it is known that a sub-group may comprise between 6 and 12 batteries, but a person skilled in the art could equally well create smaller or larger sub-groups, although the effectiveness of the invention might be decreased as a result.

Each sub-group 201, 202 of cells is associated with one stand-alone slave device 4, 4', which in this embodiment is an application-specific integrated circuit (ASIC). However, the stand-alone slave devices 4, 4' are not limited to this single type of component. They may also be, by way of non-limiting example, field-programmable gate arrays (FPGAs), a microcontroller, a microprocessor.

The stand-alone slave devices 4, 4' further comprise, for each cell, a controlled switch 60-75 and a resistor 80-95, for example a resistor of resistance comprised between 50 ohms and 150 ohms, in this embodiment a resistance of 100 ohms.

For each cell 20-35, a circuit is thus present in the associated slave device 4, 4' allowing the cell 20-35 to be balanced. This circuit comprises a resistor 80-95 and a controlled switch 60-75 in series.

When the cell 20-35 is being balanced, it discharges into its associated resistor 80-95, this discharging resulting in balancing. In other words, the charge of cell 20-35 is reduced through discharging into the associated resistor 80-95, in order to bring its charge back to a balanced charge level. However, this situation leads to notable heating of the associated resistor 80-95.

The conventional arrangement of resistors 80-95 in the stand-alone slave devices 4, 4' is an arrangement in a row, that is to say they are spatially aligned beside one another in each of the stand-alone slave devices in question, as shown in FIG. 1.

Each stand-alone slave device 4, 4' is configured to control the switches 60-67 and 68-75 associated with each of their cells 20-27 and 28-35, respectively.

By controlling a switch 60-75 shut, the stand-alone slave device 4, 4' thus allows the associated cell 20-35 to be balanced with respect to another cell 20-35 of the same sub-group 201, 202.

However, when a cell 20-35 is being balanced, the associated resistor 80-95 heats up. Thus it is advisable to avoid discharging two adjacent cells 20-35 simultaneously, as this could cause the adjacent resistors 80-95 to overheat and malfunction.

The electrical system 1 comprises a main management unit 5 that controls the operation of the stand-alone slave devices 4, 4'. In other words, the main management unit 5 is the master unit of the stand-alone slave devices 4, 4'.

The main management unit 5 may for example be an on-board computer or any other computing device able to communicate and receive measurement information from the battery cells and to control the commands given to the stand-alone slave devices 4, 4'.

This main management unit 5 and the stand-alone slave devices 4, 4' form an assembly generally known as a battery management system (BMS).

The main management unit 5 implements a method 30 for controlling the stand-alone slave devices 4, 4' to balance the cells 20-35 of the battery 2, so that it may be shut down when this balancing is actually carried out.

This method 30 is in this embodiment triggered when the main management unit 5 receives a shutdown or standby order. Thus, when an order to shut down the motor vehicle or to put it to sleep is transmitted to the main management unit 5, the latter implements the following method 30 in order to organize balancing of the batteries during its period of shutdown or sleep.

This method 30 comprises steps that are implemented in parallel or in series for each sub-group 201, 202.

Thus, for each sub-group 201, 202, a step 301 of receiving, for each cell 20-35 associated with said stand-alone slave device 4, 4', the amount of electric charge to be balanced is first implemented.

In this embodiment, by electric charge what is meant is a charge value in ampere-hours, generally written Ah, or in coulombs C.

Next, among the set of cells 20-35 of this stand-alone slave device 4, 4', the cell having the greatest amount of electric charge to be balanced is determined 302.

The cells of the same sub-group allowing voltage to be balanced with said determined cell 302 are then selected 304.

To this end, in this embodiment, steps of selecting cells based on the parity value of their associated resistors 80-95 are implemented. Specifically, this solution makes it possible to be relatively rapid from the point of view of the algorithm to be implemented.

In this example, the cells 20-35 are each associated with one resistor 80-85 the numerical reference of which has the same unit. Thus, for example, cell 21 is associated with a resistor 81, both of odd values.

As explained previously, heating of adjacent resistors 80-95 must be avoided.

Thus, a step of identifying the parity value of the resistor 80-95 of the cell determined in the preceding step 302 is initially carried out.

To this end, each cell 20-35 and each associated resistor 80-95 of the sub-group 201, 202 are associated with a numerical value, for example its numerical reference in the example, and it is checked whether the remainder of Euclidean division of this value by 2 is zero, in which case the number is even, or non-zero, in which case the number is odd.

However, the invention is not limited to this single way of determining the parity of a cell and it is within the ability of those skilled to implement any method that seems suitable. In particular, a parity indicator, for example a binary value, will possibly be associated with each cell, so as not to have to recompute the parity of the cell a number of times.

Moreover, although this first example of embodiment is based on parity selection, provision may also be made to select non-adjacent cell resistors through selection of resistors of value congruent modulo $N>2$ with the resistor of the cell determined in step 302. For example, it is especially possible to select a resistor separated by two other resistors, or in other words one resistor in three, and therefore resistors of values congruent modulo 3 with the resistor determined in step 302.

A set of candidate cells for balancing, comprising all the cells of the sub-group the associated resistor 80-95 of which has a parity identical to the parity determined for the resistor of the cell to be balanced, is then selected 304.

Cells for which the charge to be balanced is less than a predetermined threshold value are then excluded 305 from this set of candidate cells.

The predetermined threshold value is computed by calculating the product of the maximum operating time of the stand-alone slave devices 4, 4' multiplied by the maximum balancing current.

In the case of ASICs, the maximum time is for example defined to lie in a range extending from one hour to two hours—it is for example a duration of 3640 seconds—and the maximum balancing current for example lies in a range of values extending from 20 mA to 100 mA.

The invention is however not limited to this precise order of implementation of the selecting and excluding steps 304, 305. Provision could for example be made for all the cells having a charge to be balanced less than the predetermined threshold value to first be excluded 305, then for the cells having a parity identical to the parity determined for the cell to be balanced to be selected among all the remaining cells. The selection result would nonetheless be the same.

A step of commanding the stand-alone slave device associated with this sub-group 201, 202 is then implemented, so that it balances the cell having the greatest amount of electric charge to be balanced with the cells of said selection of candidate cells, by controlling the associated controlled switches.

Next, once all the stand-alone slave devices 4, 4' have received the balancing command, the main management unit 5 is shut down or put to sleep.

The method 30 thus described advantageously allows, once the main management unit 5, a BMS for example, has been put to sleep, each of the stand-alone slave devices 4, 4', which for example are ASICs, to be individually controlled so that they drive the configured controlled balancing switches 60-75 for a determined time, which is either predetermined or configurable as required.

The method is further configured so as:
not to cause abnormal heating of the resistors 80-95, through selection of non-adjacent cells 20-35 to be balanced,
not to over-discharge the cells, through definition of a minimum threshold value,
while not degrading the performance of the motor vehicle in the slightest, operation of the method being completely stand-alone.

According to a second embodiment, cells of the same sub-group 201, 202 are selected 304, in order to balance voltage with said determined cell 302, using a technique other than the parity selection of the first embodiment. In this second embodiment, all the cells not adjacent to the cell to be balanced are selected. To this end, the associated stand-alone slave device may comprise any type of data organization permitting such a determination—for example, a map of the arrangement of cells in the sub-groups 201, 202 may be stored in memory.

Such a method for controlling balancing of battery cells in "sleep" mode may be applied to any other system for monitoring multi-cell batteries in order to limit the imbalance between cells and thus preserve autonomy, not only in the automotive field but also in any other field in which implementation involves electronics.

It may for example be implemented to limit the imbalance between the cells of the batteries of laptop computers.

The method may also be implemented in stationary systems in the case where the supply of the battery management unit of the system is subject to a consumption constraint.

The invention claimed is:

1. A method for controlling balancing of the cells of a battery of electrical accumulators of an electrical system comprising a main management unit and a plurality of stand-alone slave devices,
said cells of said battery being separated into a plurality of sub-groups, each associated with one stand-alone slave device, and said cells of each sub-group being arranged beside one another,
each cell of each sub-group being each connected to a circuit in the stand-alone slave device comprising an associated controlled switch and an associated resistor,
said resistors of each stand-alone slave device being connected in a row;
for each sub-group, each stand-alone slave device is configured to receive control commands from said main management unit and to control said controlled switches depending on the received control commands so as to balance the charges of said cells of said sub-group;
said method comprising, for each stand-alone slave device of each sub-group of cells:
receiving, for each cell associated with said stand-alone slave device, the amount of electric charge to be balanced;
determining, among the set of cells-associated with said stand-alone slave device, the cell-having the greatest amount of electric charge to be balanced;
selecting, as candidate cells for balancing, the other cells of said sub-group that are associated with a resistor not adjacent to the resistor associated with said cell having the greatest amount of electric charge to be balanced;
excluding, from said selection of candidate cells, cells for which the charge to be balanced is less than a predetermined threshold value;
commanding said stand-alone slave device to control the connected switches so as to balance the cell having the greatest amount of electric charge to be balanced with the cells of said selection of candidate cells; and
shutting down the main management unit during balancing.

2. The method as claimed in claim 1, wherein, for each sub-group, the resistors associated with said cells are identified by the stand-alone slave device by a numerical identifier, the resistors being arranged in each sub-group so that two adjacent resistors have a numerical identifier of different parity, wherein the selecting step is preceded by an identifying step in which the parity value of the resistor associated with said cell having the greatest amount of electric charge to be balanced is identified,
the selecting step comprising selecting, as candidate cells for balancing, cells associated with resistors having a parity identical to the parity determined for the resistor of the cell having the greatest amount of electric charge to be balanced.

3. The method as claimed in claim 1, wherein said predetermined threshold value is determined depending on a maximum duration of stand-alone operation of the stand-alone slave devices multiplied by a maximum balancing current between two cells.

4. The method as claimed in claim 1, wherein said predetermined threshold value is set in a step prior to implementation of said method.

5. A main management unit of an electrical system comprising a battery of electric accumulators and a plurality of stand-alone slave devices,
said cells of said battery being separated into a plurality of sub-groups, each associated with one stand-alone slave device, and said cells of each sub-group being arranged beside one another,
each cell of each sub-group being each connected to a circuit in the stand-alone slave device comprising an associated controlled switch and an associated resistor,
said resistors of each stand-alone slave device being connected in a row;
for each sub-group, each stand-alone slave device is configured to receive control commands from said main management unit and to control said controlled switches depending on the received control commands so as to balance the charges of said cells of said sub-group;
said main management unit comprising:
means for receiving, for each cell associated with said stand-alone slave device, the amount of electric charge to be balanced;
means for determining, among the set of cells associated with each stand-alone slave device, the cell having the greatest amount of electric charge to be balanced, for each stand-alone slave device;
means for selecting, as candidate cells for balancing, the other cells of said sub-group that are associated with a resistor not adjacent to the resistor associated with said cell having the greatest amount of electric charge to be balanced;
means for excluding, from said selection of candidate cells, cells for which the charge to be balanced is less than a predetermined threshold value, for each stand-alone slave device;

means for commanding each stand-alone slave device to control the connected switches so as to balance the cell having the greatest amount of electric charge to be balanced with the cells of said selection of candidate cells; and means for achieving auto-shutdown during balancing.

6. An electrical system comprising a battery of electrical accumulators, a plurality of stand-alone slave devices, and the main management unit as claimed in claim 5.

7. A motor vehicle comprising the electrical system as claimed in claim 6.

* * * * *